United States Patent
Motobayashi et al.

(10) Patent No.: US 7,693,675 B2
(45) Date of Patent: Apr. 6, 2010

(54) METHOD FOR PROTECTION OF SENSOR NODE'S DATA, A SYSTEMS FOR SECURE TRANSPORTATION OF A SENSOR NODE AND A SENSOR NODE THAT ACHIEVES THESE

(75) Inventors: Masahiro Motobayashi, Kodaira (JP); Akiko Sato, Akishima (JP); Toshio Okochi, Musashino (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 11/806,966

(22) Filed: Jun. 5, 2007

(65) Prior Publication Data

US 2007/0299624 A1 Dec. 27, 2007

(30) Foreign Application Priority Data

Jun. 12, 2006 (JP) .............................. 2006-162378

(51) Int. Cl.
G01R 29/00 (2006.01)

(52) U.S. Cl. ..................................................... 702/117

(58) Field of Classification Search ................. 702/117, 702/118, 182–185, 188
See application file for complete search history.

(56) References Cited

U.S. PATENT DOCUMENTS

2004/0157585 A1   8/2004   Sashihara

2004/0205335 A1   10/2004   Park
2005/0140964 A1*  6/2005   Eschenauer et al. ........... 356/10
2006/0190458 A1*  8/2006   Mishina et al. ................ 707/10

FOREIGN PATENT DOCUMENTS

JP   2003-087242   12/2001
JP   2004-241976   2/2003
JP   2004-318881   4/2004

OTHER PUBLICATIONS

ZigBee™ Alliance, Version 1.00; Security Services Specification Revision 13 (Dec. 14, 2004), pp. 1-103.

* cited by examiner

*Primary Examiner*—Edward Raymond
(74) *Attorney, Agent, or Firm*—Stites & Harbison PLLC; Juan Carlos A. Marquez, Esq.

(57) ABSTRACT

Methods of confidential data sharing and mutual authentication between a sensor node and a router are established, and data in the sensor node is protected from a physical attack. Sensor node issuing processing is performed on a sensor node having a tamper resistant device. The sensor node issuing processing is processing in which data and a function that are deactivated are loaded in the tamper resistant device of the sensor node from the time of manufacture of the sensor node to the time the sensor node reaches a system that runs the sensor node. Activation data is used to activate the deactivated data and function. The activation data is shared between stages of the issuing processing with the use of a data management system.

20 Claims, 15 Drawing Sheets

| # | DATA LOADED INTO TAMPER RESISTANT DEVICE (121) |
|---|---|
| 1 | INITIAL KEY |
| 2 | DEACTIVATED INITIAL DATA |
| 3 | INITIAL FUNCTION |

*FIG. 5*

| # | DATA LOADED INTO DATA MANAGEMENT DATABASE (115) | |
|---|---|---|
| 1 | SENSOR NODE IDENTIFIER | INITIAL KEY |
| | | MANUFACTURER KEY |

*FIG. 6*

| # | DATA LOADED INTO TAMPER RESISTANT DEVICE (121) |
|---|---|
| 1 | INITIAL KEY |
| 2 | INITIAL FUNCTION |
| 3 | DEACTIVATED INITIAL DATA |
| 4 | DEACTIVATED OPERATIONAL FUNCTION DATA |
| 5 | TRANSPORTATION KEY |
| 6 | TRANSPORTATION FUNCTION |

*FIG. 8*

| # | DATA LOADED INTO DATA MANAGEMENT DATABASE (115) | |
|---|---|---|
| 1 | SENSOR NODE IDENTIFIER | INITIAL KEY |
| | | MANUFACTURER KEY |
| | | TRANSPORTATION KEY |
| | | LOADER KEY |

*FIG. 9*

| # | DATA LOADED INTO TAMPER RESISTANT DEVICE (121) |
|---|---|
| 1 | INITIAL KEY |
| 2 | INITIAL FUNCTION |
| 3 | TRANSPORTATION KEY |
| 4 | TRANSPORTATION FUNCTION |
| 5 | DEPLOYMENT KEY |
| 6 | INITIAL DATA |
| 7 | OPERATIONAL FUNCTION DATA |
| 8 | DEPLOYMENT DATA |
| 9 | DEPLOYMENT FUNCTION |

*FIG. 11*

| # | DATA LOADED INTO DATA MANAGEMENT DATABASE (115) | |
|---|---|---|
| 1 | SENSOR NODE IDENTIFIER | INITIAL KEY |
| | | MANUFACTURER KEY |
| | | TRANSPORTATION KEY |
| | | LOADER KEY |
| | | DEPLOYMENT KEY |

*FIG. 12*

| # | DATA LOADED INTO TAMPER RESISTANT DEVICE (121) |
|---|---|
| 1 | INITIAL KEY |
| 2 | INITIAL FUNCTION |
| 3 | MANUFACTURER KEY |
| 4 | DEACTIVATED INITIAL DATA |
| 5 | DEACTIVATED OPERATIONAL FUNCTION DATA |
| 6 | TRANSPORTATION KEY |
| 7 | TRANSPORTATION FUNCTION |

*FIG. 15*

| # | DATA LOADED INTO TAMPER RESISTANT DEVICE (121) |
|---|---|
| 1 | INITIAL KEY |
| 2 | INITIAL FUNCTION |
| 3 | MANUFACTURER KEY |
| 4 | INITIAL DATA |
| 5 | TRANSPORTATION KEY |
| 6 | TRANSPORTATION FUNCTION |
| 7 | LOADER KEY |
| 8 | OPERATIONAL FUNCTION DATA |
| 9 | DEPLOYMENT KEY |
| 10 | DEPLOYMENT DATA |
| 11 | DEPLOYMENT FUNCTION |

*FIG. 17*

METHOD FOR PROTECTION OF SENSOR NODE'S DATA, A SYSTEMS FOR SECURE TRANSPORTATION OF A SENSOR NODE AND A SENSOR NODE THAT ACHIEVES THESE

CLAIM OF PRIORITY

The present application claims priority from Japanese application P2006-162378 filed on Jun. 12, 2006, the content of which is hereby incorporated by reference into this application.

BACKGROUND OF THE INVENTION

This invention relates to a communication technique using sensor nodes. In particular, the invention relates to a technique of sharing confidential data and functions between a sensor node and a router, as well as protecting data in the sensor node.

Sensor nets in which many sensor nodes are connected through short-distance wireless communications have gained popularity in recent years. Using wireless communications to broadcast data, sensor nets contain such security risks as interception, tampering, and impersonation. Also, sensor nodes in sensor nets are often placed in unmanned sites, which gives rise to another set of problems including theft of data from a sensor node by physical means.

"Security Services Specification Revision 13, Version 1.00" (ZigBee Alliance, Dec. 14, 2004) proposes to use confidential data such as encryption keys given to sensor nodes in protecting wireless communications between sensor nodes against security risks.

In JP 2003-87242 A, JP 2004-318881 A, and JP 2004-241976 A, protection against security risks is accomplished by loading of confidential data and sensor node authentication performed by routers with the use of the confidential data.

SUMMARY OF THE INVENTION

Problems to be solved by this invention are how to protect wireless communications between a sensor node, which is limited in electric power and other resources, and a router against security risks such as interception and tampering, and how to protect a sensor node from an attack that involves physical theft of data in the sensor node. "Attack to a sensor node" refers to unauthorized obtainment of data from an IC by, for example, intentionally causing malfunctioning of the IC by applying high pressure to the IC or irradiating the IC with laser light.

"Security Services Specification Revision 13, Version 1.00" cited above suggests to use confidential data shared by sensor nodes for protection against security risks, but does not address how the confidential data is shared.

According to JP 2003-87242 A, JP 2004-318881 A, and JP 2004-241976 A, loading of confidential data and sensor node authentication by routers are performed uniformly throughout all sensor nodes. Sensor nodes can therefore be used by any computer system that is within their wireless communication range when in operation and that knows the confidential data. However, there is a problem that, since the sensor nodes are not designed to perform router authentication, it is impossible for the sensor nodes to judge the authenticity of a router and to send data in a form that is comprehensible only to a valid router.

In addition, the way sensor nodes are used makes it difficult to prevent sensor nodes from being stolen. If data is seized from a stolen sensor node through a physical attack upon the sensor node, the entire system may be damaged, and defensive measures have to be taken against this.

An object of this invention is therefore to establish methods of confidential data sharing and mutual authentication between a sensor node and a router, and to establish a method of protecting data in a sensor node from a physical attack. Specifically, an object of this invention is to protect data that has been stored in a sensor node from the time of manufacture of the sensor node up to the time the use of the sensor node is started.

The present invention relates to a sensor node data protection method for setting unique data to a sensor node and protecting the unique data, the sensor node having a radio communication module for performing communications with one of a router (base station), a first computer system, and a second computer system, and a storage unit for holding data, the sensor node data protection method including the steps of:

creating, by the first computer system, a first key and a second key;

deactivating, by the first computer system, the unique data with the first key, and storing the deactivated unique data in the storage unit of the sensor node;

storing, by the first computer system, the second key in the storage unit of the sensor node;

storing, by the first computer system, the first key and the second key in a computer system set in advance;

obtaining, by the second computer system, the first key and the second key from the computer system set in advance after the sensor node arrives at the second computer system from the first computer system; and executing authentication using the second key that is obtained by the second computer system and the second key that is in the storage unit of the sensor node.

Further, the first computer system is a computer system for setting functions in the sensor node; and the second computer system is a router of a sensor net system for performing communications with the sensor node. When the authentication succeeds, the router sends a key that is used for communications to the sensor node.

Further, when the authentication succeeds, the second computer system reads the deactivated unique data out of the storage unit of the sensor node, and activates the deactivated unique data with the obtained first key.

According to this invention, a sensor node performs mutual authentication with a router or a second computer system, thereby limiting parties that can communicate with the sensor node and making communications between the sensor node and a computer system secure. In addition, access to unique data loaded in the sensor node can be controlled, which makes secure sensor node operation possible.

BRIEF DESCRIPTION OF THE DRAWINGS

FIG. 5 is an explanatory diagram showing an example of data that is stored in a tamper resistant device of the sensor node through the processing executed in the sensor node manufacturing system.

FIG. 6 is an explanatory diagram showing an example of data that is stored in a data management database through the processing executed in the sensor node manufacturing system.

FIG. 8 is an explanatory diagram showing an example of data that is stored in the tamper resistant device of the sensor node through the processing executed in the operational function loading system.

FIG. 9 is an explanatory diagram showing an example of data that is stored in the data management database through the processing executed in the operational function loading system.

FIG. 11 is an explanatory diagram showing an example of data that is stored in the tamper resistant device of the sensor node through the processing executed in the deployment management system.

FIG. 12 is an explanatory diagram showing an example of data that is stored in the data management database through the processing executed in the deployment management system.

FIG. 15 is an explanatory diagram showing an example of data that is stored in the tamper resistant device of the sensor node through the processing executed in the operational function loading system according to the second embodiment.

FIG. 17 is an explanatory diagram showing an example of data that is stored in the tamper resistant device of the sensor node through the processing executed in the deployment management system according to the second embodiment.

DETAILED DESCRIPTION OF THE PREFERRED EMBODIMENTS

The best mode of carrying out this invention will be described below with reference to the drawings. The basic configuration of a computer system to which this invention is applied is shown in FIG. 1.

Figure 1:
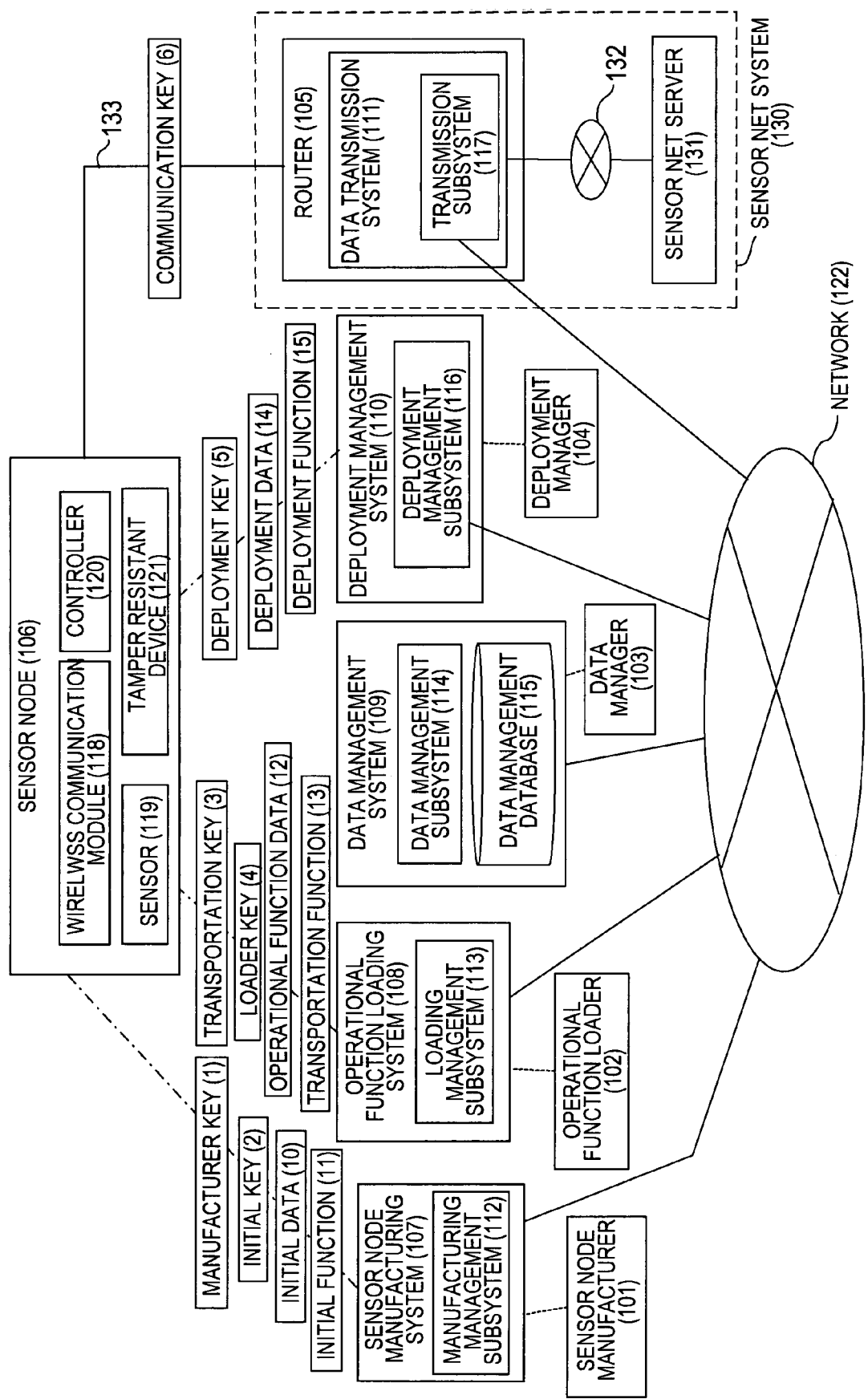
FIG. 1 is a block diagram showing a configuration of a computer system to which this invention is applied.

FIG. 1 is a block diagram of a computer system according to a first embodiment of this invention. Shown in FIG. 1 is an example of a computer system that communicates with a sensor node 106 from when the sensor node 106 is manufactured until when the sensor node 106 is put into use.

The sensor node 106 is manufactured by a sensor node manufacturing system 107. Thereafter, an operational function loading system 108 sets in the sensor node 106 basic data necessary for running the sensor node 106 in a sensor net system 130, which contains a router 105 as a base station. More detailed data for running the sensor node 106 is set in the sensor node 106 by a deployment management system 110. The sensor node 106 is then moved to the sensor net system 130, where the sensor node 106 is actually run, and starts operating. In the example of FIG. 1, the sensor node manufacturing system 107 represents a maker A which manufactures hardware of the sensor node 106, the operational function loading system 108 represents a maker B which manufactures software of the sensor net system 130, and the deployment management system 110 represents a company (or an organization) C which runs the sensor net system 130. The sensor net system 130 represents a company (or an organization) D which is a customer of the makers A and B and the company C (a user of the sensor net system 130). This embodiment shows an example in which the manufactured sensor node 106 is transported from the sensor node manufacturing system 107 to the deployment management system 110, and incorporated in the sensor net system 130 after the deployment management system 110 sets given settings in the transported sensor node 106.

The maker B manufacturing software and the company C commissioned to run the sensor net system 130 may be the same entity. In this case, the operational function loading system 108 and the deployment management system 110 may be integrated into one.

In the example of this embodiment, the sensor node 106 manufactured by the sensor node manufacturing system 107 is transported to the operational function loading system 108 to be put through a process of setting basic data for operation, then transported to the deployment management system 110 to be put through a process of setting detailed data for operation, and lastly transported to the sensor net system 130 to be actually run. The data stored in the sensor node 106 during the transportation of the sensor node 106 from one system to another is protected, in this example, via a data management system 109.

The computer system in the example of FIG. 1 has the sensor node manufacturing system 107, which manufactures the sensor node 106, the operational function loading system 108, which loads basic data/function in the sensor node 106, the deployment management system 110, which sets detailed data in the sensor node 106, the router 105 of the sensor net system 130 where the sensor node 106 is actually run, and the data management system 109, which provides data stored in the sensor node 106 protection while the sensor node 106 is transported from one system to another.

The sensor node manufacturing system 107 has a manufacturing management subsystem 112, which, upon manufacture of the sensor node 106, loads (sets) initial data 10 and an initial function 11 in the sensor node 106. The sensor node manufacturing system 107 is managed by a sensor node manufacturer 101, and the manufacturing management subsystem 112 is composed of, for example, a computer. The sensor node manufacturing system 107 also has a communication device (omitted from the drawing) for communicating with the manufactured sensor node 106.

The operational function loading system 108 loads basic data necessary to run the sensor node 106 in the sensor net system 130. The operational function loading system 108 sets the data in the sensor node 106 through a loading management subsystem 113. The operational function loading system 108 is managed by an operational function loader 102. The operational function loading system 108 also has a communication device (omitted from the drawing) for communicating with the manufactured sensor node 106.

The data management system 109 manages data loaded in the sensor node 106 and other data. The data management system 109 has a data management subsystem 114, which performs appropriate processing in response to data registration requests and return requests made by other systems, and a data management database 115, which holds data. The data management subsystem 114 and the data management database 115 are composed of computers. The data management system 109 is managed by a data manager 103.

The deployment management system 110 has a deployment management subsystem 116, which sets detailed settings necessary for running the sensor node 106. The router 105 has a data transmission system 111 to communicate with the sensor node 106. The data transmission system 111 can also communicate with other computer systems over a network 112. The data transmission system 111 has a data transmission subsystem 117, which executes processing for secure communications with the sensor node 106. The deployment management system 110 is managed by a deployment manager 104. The deployment management system 110 also has a communication device (omitted from the drawing) for communicating with the manufactured sensor node 106.

The sensor node 106 has a radio communication module 118, which communicates wireless, a sensor 119, which observes various kinds of data, a controller 120, which controls the sensor node 106, and a tamper resistant device 121, which stores data and keeps the stored data safe.

The sensor net system 130 has the router 105, which communicates with the sensor node 106 to obtain data from the sensor 119 (sensing data), a sensor net server 131, which stores sensing data collected by the router 105 and provides a service based on the sensing data to a not-shown client computer or the like, and a network 132, which connects the router 105 and the sensor net server 131 to each other. The not-shown client computer is also connected to the network 132. The router 105 can be connected to multiple sensor nodes 106 via a wireless network 133.

The sensor net server 131 semantically stores sensing data collected through the router 105, and provides a service set in advance. The sensing data is stored semantically by, for example, when the sensor 119 of the sensor node 106 is a temperature sensor, attaching meaning such as Celsius or Fahrenheit to binary format sensing data before storing the sensing data. This annotation may be performed by the router 105.

The sensor node 106 shown in FIG. 1 is connected to the sensor node manufacturing system 107 and other systems sequentially through wireless communications.

The sensor node manufacturing system 107 shown in FIG. 1 handles only one sensor node 106. However, needless to say, the sensor node manufacturing system 107 manufactures a plurality of sensor nodes.

Basically, the sensor node manufacturing system 107, the operational function loading system 108, the data management system 109, the deployment management system 110, and the data transmission system 111 are connected with one another via the network 122 and exchange data by sending and receiving messages on line. Alternatively, the systems may exchange data by mailing/handing a data recording medium such as a floppy disk, or mailing/handling a hard copy according to the policy of the organization that runs the computer system.

Figure 2:
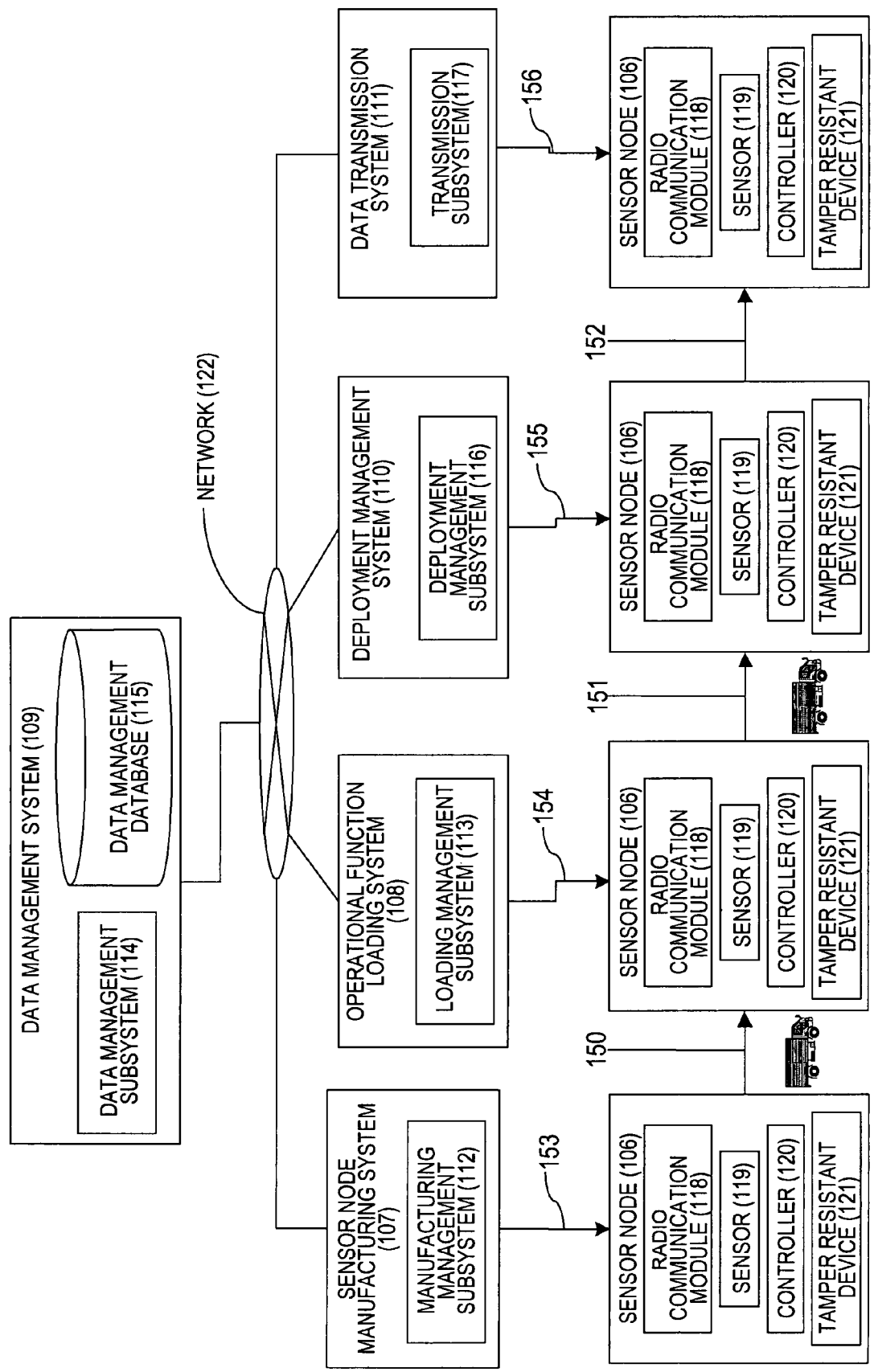
FIG. 2 is a block diagram outlining issuing processing in a sensor node.

This invention includes (i) processing for secure operation of the tamper resistant device 121 of the sensor node 106 and (ii) processing for allowing only limited routers 105 to communicate with the sensor node 106, thereby accomplishing secure communications. These two types of processing will collectively be referred to as issuing processing. FIG. 2 is a block diagram outlining the issuing processing.

In the processing for secure operation of the tamper resistant device 121, deactivated data is loaded (153, 154, and 155 shown in FIG. 2) in the tamper resistant device 121 of the sensor node 106 before the sensor node 106 manufactured in the sensor node manufacturing system 107 is transported to the operational function loading system 108 (150 shown in FIG. 2) and before the sensor node 106 is transported from the operational function loading system 108 to the deployment management system 110 (151 shown in FIG. 2). "Deactivation of data" here means processing of encrypting data with the use of a key, which will be described later, or by other encryption measures, in order to make it difficult for a third party to extract the data. Deactivation in the following description refers to data encryption with the use of a software key. However, this invention is not limited thereto. Other methods are employable as long as authentication is performed for each system that the sensor node 106 passes and only successfully authenticated systems are allowed to access data stored in the sensor node 106.

Data in the sensor node 106 that is deactivated by the above systems is activated by using system activation data of the data management system 109. The above systems register the activation data in the data management system 109, so that the activation data is transferred from one system to another securely. "Activation of data" here means decryption of data that has been deactivated by encryption or other methods, with the use of a given key or the like.

In the processing for establishing secure communications between the sensor node 106 and the router 105, the deployment management system 110 has the sensor node 106 and the router 105 share confidential data.

The sensor node 106 is moved in the issuing processing through transportation or the like among the above systems where deactivated data is loaded in the sensor node 106 (150, 151, 152 in FIG. 2).

FIG. 1 is simplified by showing only one router 105 that can communicate with the sensor node 106, but the sensor node 106 may communicate with multiple routers depending on the use of the sensor node 106.

Figure 3:
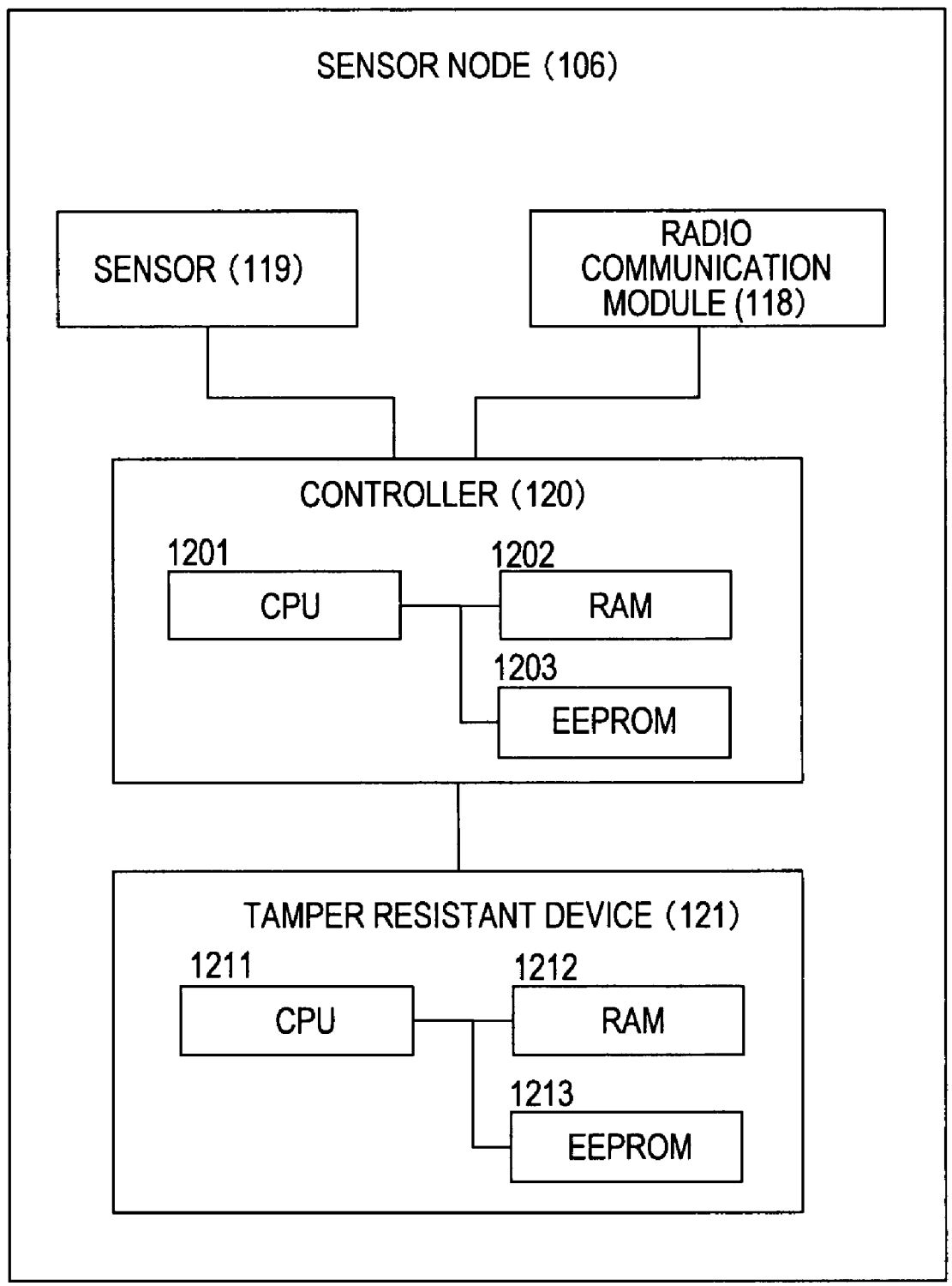
FIG. 3 is a block diagram showing a configuration of the sensor node.

FIG. 3 is a block diagram showing an example of the sensor node 106 which has the tamper resistant device 121.

The controller 120 has a CPU 1201, which performs computation, a non-volatile memory (EEPROM in FIG. 3) 1203, which holds a program set in advance, and a memory (RAM in FIG. 3) 1202, which temporarily stores data. The non-volatile memory 1203 may be a flash memory or the like instead of an EEPROM. The memory 1202 may be a DRAM in which data can be written any number of times, or the like. The CPU 1201 reads a program stored in advance in the non-volatile memory 1203 onto the memory 1202, and executes the read program to perform given processing.

In FIG. 3, the tamper resistant device 121 includes a CPU 1211, which performs computation, a non-volatile memory (EEPROM in FIG. 3) 1213, which holds an identifier and similar data set in advance as well as a preset program, and a memory (RAM in FIG. 3) 1212, which temporarily stores data. The non-volatile memory 1213 may be a flash memory or the like instead of an EEPROM. The memory 1212 may be a DRAM in which data can be written any number of times, or the like. By communicating with the CPU 1201 of the controller 120, the CPU 1211 reads a program stored in advance in the non-volatile memory 1213 onto the memory 1212 to perform given processing, and reads/writes an identifier and other data stored in the non-volatile memory 1213. The tamper resistant device 121 is, as disclosed in JP 2006-107305 A, a security module made up of an IC card LSI or the like. Anti-tampering technology such as data encryption is applied to the tamper resistant device 121 in order to make it difficult to read data inside the device not only electronically but also physically, by, for example, reading and measuring electric current or electromagnetic waves.

Figure 4:
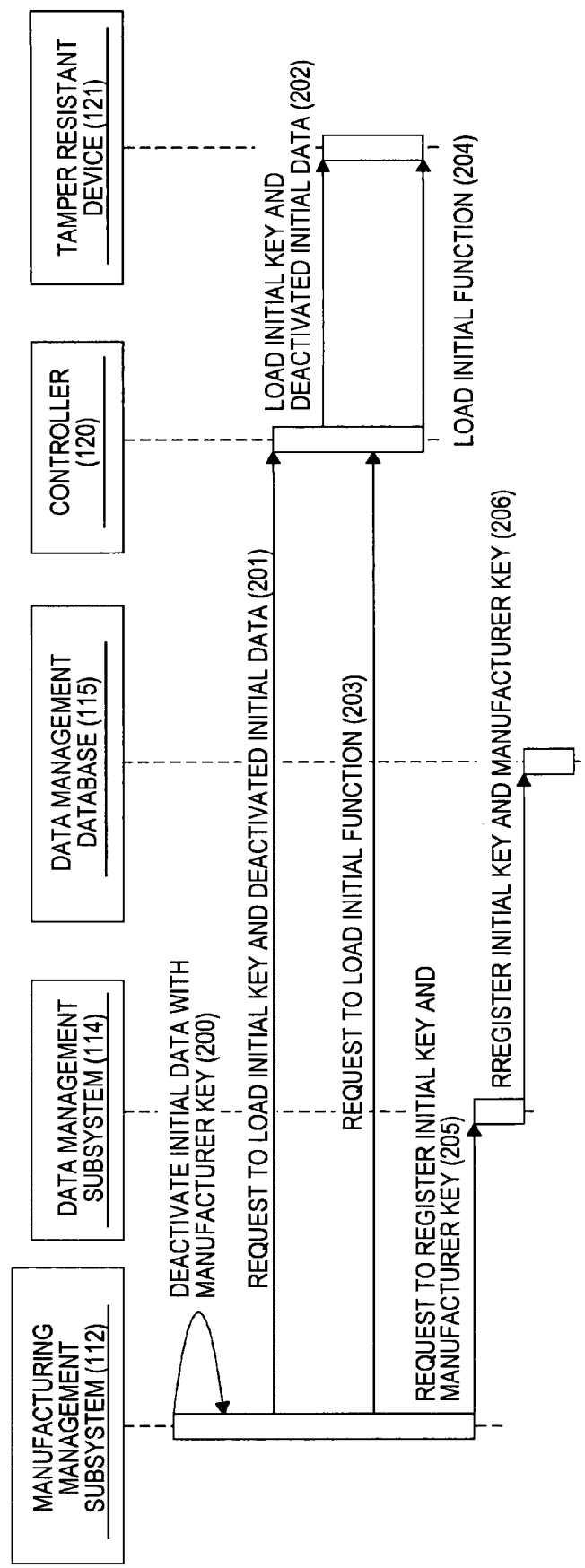
FIG. 4 is a time chart showing an example of processing that is executed in a sensor node manufacturing system.

FIG. 4 is a time chart showing steps of processing in which the sensor node manufacturing system 107 loads the initial function 11 in the sensor node 106, loads in the sensor node 106 the initial data 10 that is deactivated, and registers an manufacturer key 1 that is activated and an initial key 2 in the data management system 109. This processing is executed before the manufactured sensor node 106 is transported to the operational function loading system 108, which processes the sensor node 106 next.

In FIG. 4, first, the manufacturing management subsystem 112 of the sensor node manufacturing system 107 creates the manufacturer key 1 and the initial key 2. The manufacturing management subsystem 112 uses the manufacturer key 1 to deactivate the initial data 10 of the sensor node 106 which is set in advance (or, which is created by the manufacturing management subsystem 112) (200). The initial data 10 is identification data unique to each sensor node 106, and contains an identifier and the like. The initial function 11 contains a function used to identify other sensor nodes and routers (e.g., basic communication function), and other functions that are used mainly for actual operation of the sensor node 106.

The manufacturer key 1 is a key created by the sensor node manufacturing system 107 as mentioned above. The manufacturer key 1 is, in some cases, created for each sensor node and, in other cases, created for each sensor node group consisting of a number of sensor nodes. In still other cases, one same manufacturer key 1 is created for all manufactured sensor nodes.

Next, the manufacturing management subsystem 112 has the controller 120 of the sensor node 106 load (store) in the tamper resistant device 121 the initial key 2 and the initial data 10 that has been deactivated (201, 202). The initial data 10 is stored in, for example, the non-volatile memory 1213 of the tamper resistant device 121.

The initial key 2 is a key created by the sensor node manufacturing system 107 as mentioned above, and is used for purposes including authentication between the sensor node 106 and the above systems. The initial key 2 is, in some cases, created for each sensor node and, in other cases, created for each sensor node group consisting of a number of sensor nodes. In still other cases, one same initial key 2 is created for all manufactured sensor nodes.

Subsequently, the manufacturing management subsystem 112 has the controller 120 of the sensor node 106 loads the initial function 11 in the tamper resistant device 121 (203, 204). The initial function 11 is stored in, for example, the non-volatile memory 1213 of the tamper resistant device 121.

The initial function 11 is a basic function (a basic transmission program) loaded in the sensor node 106 by the sensor node manufacturing system 107. The initial function 11 contains a function of performing authentication processing on the above systems with the use of the initial key 2, and other data/functions that are used mainly in the issuing processing. The initial function 11 is, in some cases, created for each sensor node and, in other cases, created for each sensor node group consisting of a number of sensor nodes. In still other cases, one same initial function 11 is created for all manufactured sensor nodes.

Next, the manufacturing management subsystem 112 has the data management subsystem 114 register the identifier of the sensor node 106, the initial key 2, and the manufacturer key 1 in the data management database 115 of the data management system 109 (205, 206). The identifier of the sensor node 106 that is contained in the initial data 10 can be a globally unique ID such as MAC address, a node ID set in advance, and any other data with which the sensor node 106 is uniquely identified.

FIG. 5 shows what data is held in the tamper resistant device 121 of the sensor node 106 upon completion of the processing by the sensor node manufacturing system 107. At the time the processing of FIG. 4 is finished, the initial key 2, the initial data 10, and the initial function 11 are included in the non-volatile memory 1213 of the tamper resistant device 121, and the initial data 10 is deactivated by the manufacturer key 1. FIG. 6 shows what data of the sensor node 106 is held in the data management database 115 upon completion of the processing of FIG. 4. At the time the processing of FIG. 4 is finished, the manufacturer key 1 and the initial key 2 which are created by the sensor node manufacturing system 107 are in the data management database 115 of the data management system 109 as data of the sensor node 106.

After the above processing is completed, the sensor node 106 is transported to the operational function loading system 108. Even when someone with malicious intent extracts the initial data 10 from the non-volatile memory 1213 of the tamper resistant device 121 during the transportation, the initial data 10 deactivated with the manufacturer key 1 cannot be easily deciphered.

Figure 7:
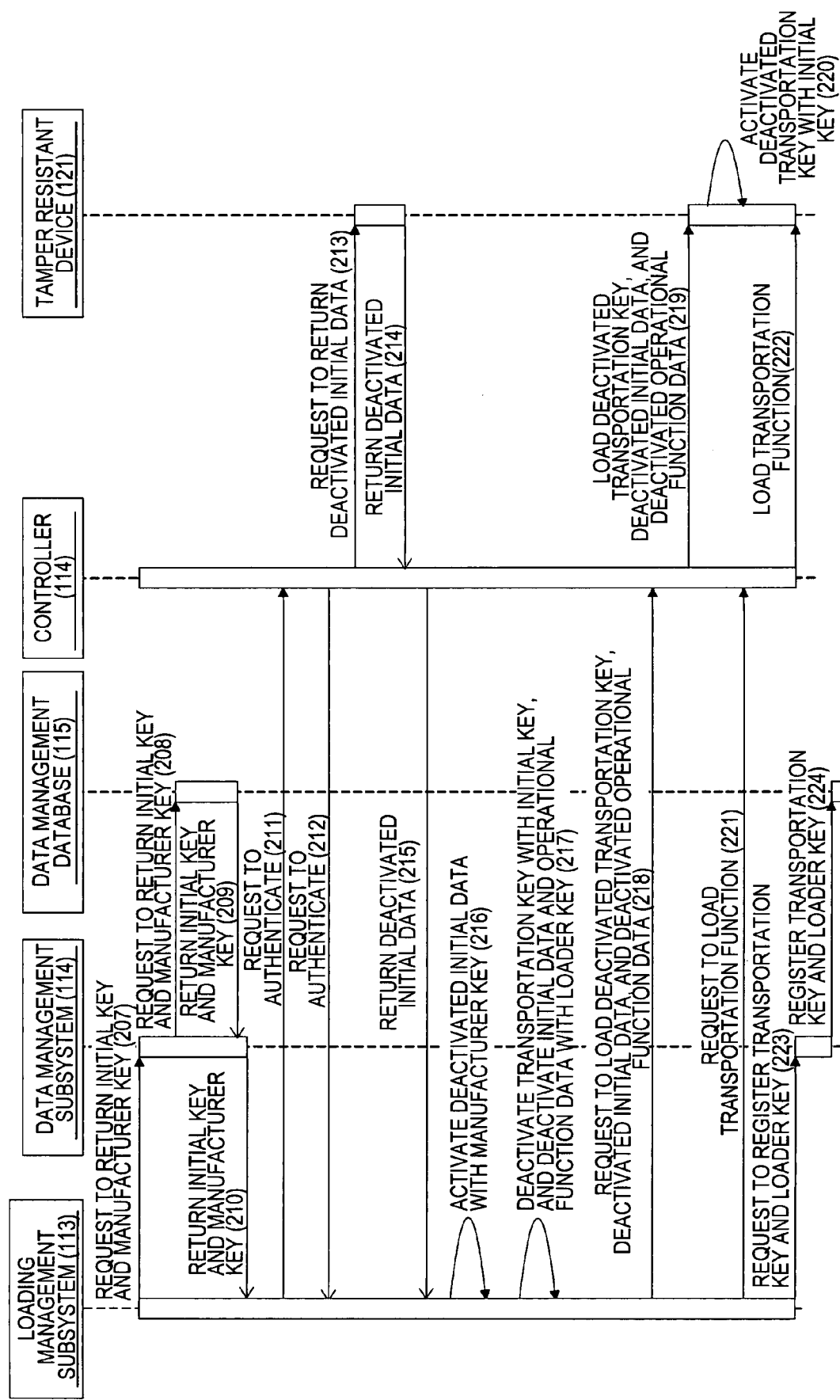
FIG. 7 is a time chart showing an example of processing that is executed in an operational function loading system.

FIG. 7 is a time chart showing steps of processing in which the operational function loading system 108 loads operational function data 12 that is deactivated and a transportation function 13 in the transported sensor node 106, and registers a transportation key 13 that is activated and a loader key 4 in the data management system 109.

The loading management subsystem 113 of the operational function loading system 108 receives the initial key 2 and the manufacturer key 1 from the data management database 115 through the data management subsystem 114 (207, 208, 209, 210) in order to activate the deactivated initial data 10 which has been loaded in the tamper resistant device 121 of the sensor node 106 received through transportation or the like.

Next, the loading management subsystem 113 and the controller 120 of the sensor node 106 perform mutual authentication using the initial key 2 (211, 212). This authentication is a success when, for example, the initial key 2 obtained by the operational function loading system 108 from the data management system 109 matches the activated initial key 2 which is read out of the tamper resistant device 121 of the sensor node 106. When the former and latter initial keys 2 do not match, there is a possibility that the sensor node 106 is tampered during transportation and the authentication fails.

When the mutual authentication succeeds, the controller 120 extracts the deactivated initial data 10 from the tamper resistant device 121 (213, 214), and sends the extracted data to the loading management subsystem 113 (215).

The loading management subsystem 113 uses the manufacturer key 1 obtained from the data management system 109 to activate the deactivated initial data 10 (216). The operational function loading system 108 issues the transportation key 3 and the loader key 4. The operational function loading system 108 then deactivates the transportation key 3 with the initial key 2, and uses the loader key 4 to deactivate the operational function data 12 and the initial data 10 activated in Step 216 (217).

The transportation key 3 is a key created by the operational function loading system 108, and is used for purposes including authentication between the sensor node 106 and the above systems. The transportation key 3 is, in some cases, created for each sensor node and, in other cases, created for each sensor node group consisting of a number of sensor nodes. In still other cases, one same transportation key 3 is created for all manufactured sensor nodes.

The operational function data 12 contains a function of ensuring the completeness and reliability of transmitted/received data, and other general functions that are used mainly for actual operation of the sensor node 106. The operational function data 12 is created in advance in the operational function loading system 108.

The loader key 4 is a key created by the operational function loading system 108. The loader key 4 is, in some cases, created for each sensor node and, in other cases, created for each sensor node group consisting of a number of sensor nodes. In still other cases, one same loader key 4 is created for all manufactured sensor nodes.

The loading management subsystem 113 sends, through the controller 120, to the tamper resistant device 121, a request to load the deactivated transportation key 3, the deactivated initial data 10, and the deactivated operational function data 12 (218, 219).

To summarize, a key issued by a system that is currently processing the sensor node 106 (here, the transportation key 3 issued by the operational function loading system 108) is deactivated (encrypted) with a key issued by a preceding system (here, the initial key 2 issued by the sensor node manufacturing system 107) from which the sensor node 106 has been transported. The key issued by the system that is currently processing the sensor node 106 (here, the transportation key 3 issued by the operational function loading system 108) is used to deactivate data that is to be stored in the sensor node 106. The loading management subsystem 113 then communicates with the sensor node 106 to send data deactivated with different keys.

The controller 120 of the sensor node 106 uses the initial key 2 to activate the deactivated transportation key 3 in the tamper resistant device 121 (220). Specifically, decryption of the transportation key 3 is executed by the CPU 1211 of the tamper resistant device 121.

The loading management subsystem 113 next loads the activated transportation function 13 in the tamper resistant device 121 through the controller 120 (221, 222). The transportation function 13 is a function loaded in the sensor node 106 by the operational function loading system 108, and contains data/function used mainly in the issuing processing. The transportation function 13 is composed of such data as a measuring procedure in accordance with the type of the sensor 119 of the sensor node 106 and a communication procedure in accordance with a communication protocol specific to each sensor net system 130 employed. The transportation function 13, too, is created in advance in the operational function loading system 108. The transportation function 13 is, in some cases, created for each sensor node and, in other cases, created for each sensor node group consisting of a number of sensor nodes. In still other cases, one same transportation key 3 is created for all manufactured sensor nodes.

The loading management subsystem 113 has the data management subsystem 114 register the identifier of the sensor node 106, the transportation key 3, and the loader key 4 in the data management database 115 (223, 224).

FIG. 8 shows data held in the non-volatile memory 1213 of the tamper resistant device 121 upon completion of the processing of FIG. 7. The operational function loading system 108 adds the operational function data 12, the transportation key 3, and the transportation function 13 to the non-volatile memory 1213 of the tamper resistant device 121.

FIG. 9 shows what data of the sensor node 106 is held in the data management database 115 upon completion of the processing of FIG. 7. The operational function loading system 108 adds the transportation key 3 and the loader key 4 to the record entry for the sensor node 106 in the data management database 115.

After the above processing is completed, the sensor node 106 is transported from the operational function loading system 108 to the deployment management system 110. Even when someone with malicious intent extracts the initial data 10, the operational function data 12, and the transportation function 13 from the non-volatile memory 1213 of the tamper resistant device 121 during the transportation, the initial data 10, the operational function data 12, and the transportation data 13 that have been deactivated with the loader key 4 cannot be easily deciphered.

Figure 10:
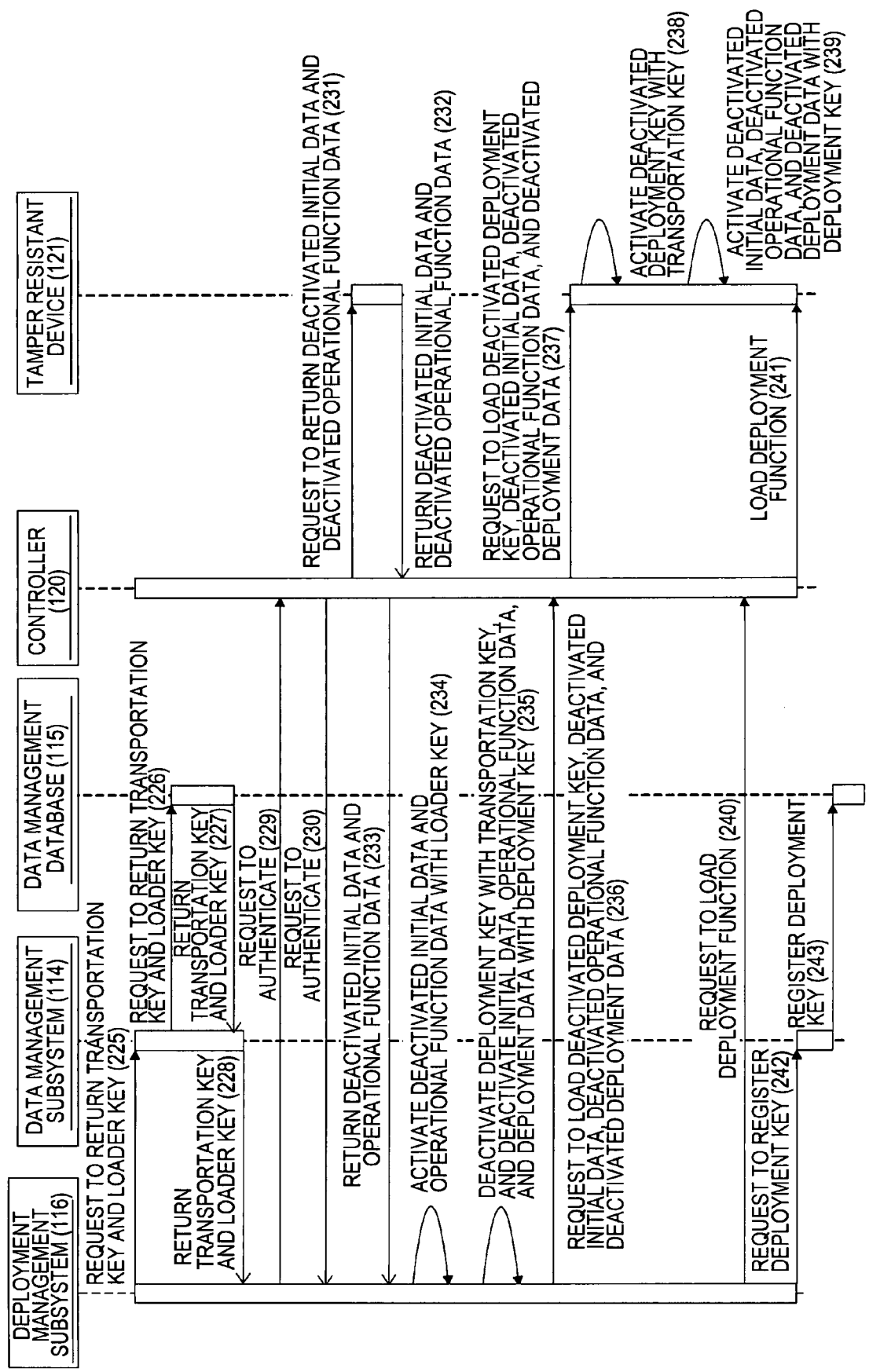
FIG. 10 is a time chart showing an example of processing that is executed in a deployment management system.

FIG. 10 is a time chart showing steps of processing in which the deployment management system 110 loads in the transported sensor node 106 deployment data that is deactivated, and registers in the data management system 109 a deployment key 5 that is activated.

The deployment management subsystem 116 of the deployment management system 110 obtains the transportation key 3 and the loader key 4 from the data management database 115 through the data management subsystem 114 of the data management system 109 in order to activate the deactivated initial data 10 and the deactivated operational function data 12 which have been loaded in the tamper resistant device 121 of the sensor node 106 received through transportation or the like (225, 226, 227, 228).

Next, the deployment management subsystem 116 and the controller 120 of the sensor node 106 perform mutual authentication using the transportation key 3 (229, 230). As in Steps 211 and 212, this authentication is a success when the transportation key 3 obtained by the deployment management subsystem 116 matches the activated transportation key 3 in the non-volatile memory 1213 of the tamper resistant device 121. When the former and latter transportation keys 3 do not match, there is a possibility that the sensor node 106 is tampered during transportation and the authentication fails.

When the mutual authentication between the deployment management subsystem 116 and the controller 120 of the sensor node 106 succeeds, the controller 120 extracts the deactivated initial data 10 and the deactivated operational function data 12 from the tamper resistant device 121 (231, 232), and sends the extracted data to the deployment management subsystem 116 (233).

The deployment management subsystem 116 uses the loader key 4 obtained from the data management system 109 to activate the deactivated initial data 10 and the deactivated operational function data 12 (234).

The deployment management system 110 creates the deployment key 5 at this point. The deployment management subsystem 116 deactivates the deployment key 5 using the transportation key 3, and uses the deployment key 5 to deactivate the deployment data 14 as well as the initial data 10 and the operational function data 12 that have been activated in Step 234 (235).

The deployment key 5 is a key created by the deployment management system 110, and is used for purposes including authentication between the sensor node 106 and the above systems. The deployment key 5 is, in some cases, created for each sensor node and, in other cases, created for each sensor node group consisting of a number of sensor nodes. In still other cases, one same deployment key 5 is created for all manufactured sensor nodes.

The deployment data 14 contains data of the router 105 that communicates with the sensor node 106 and other data/functions exclusive to the sensor node 106 which determines the operation policy and the like in actual operation of the sensor node 106. The deployment data 14 often varies from one sensor node to another but, in some cases, the same deployment data 14 is used in a sensor node group consisting of a number of sensor nodes 106. The deployment data 14 is created in advance in the deployment management system 110.

Next, the deployment management subsystem 116 sends, through the controller 120, to the tamper resistant device 121, a request to load the deactivated deployment key 5, the deactivated initial data 10, the deactivated operational function data 12, and the deactivated deployment data 14 (236, 237).

To summarize, a key issued by a system that is currently processing the sensor node 106 (here, the deployment key 5 issued by the deployment management system 110) is deactivated (encrypted) with a key issued by a preceding system (here, the loader key 4 issued by the operational function loading system 108) from which the sensor node 106 has been transported. The key issued by the system that is currently processing the sensor node 106 (here, the deployment key 5 issued by the deployment management system 110) is used to deactivate data that is to be stored in the sensor node 106. The deployment management subsystem 116 then communicates with the sensor node 106 to send data deactivated with different keys.

The controller 120 uses the transportation key 3 to activate the deactivated deployment key 5 in the tamper resistant device 121 (238), and activates the deactivated initial data 10, the deactivated operational function data 12, and the deactivated deployment data 14 with the activated deployment key 5 (239).

To summarize, a key issued by a system that is currently processing the sensor node 106 (here, the deployment key 5 issued by the deployment management system 110) is activated (decrypted) with a key issued by a preceding system (here, the transportation key 3 issued by the operational function loading system 108) from which the sensor node 106 has been transported. The deployment key 5 is used to activate data that is in the sensor node 106, and the sensor node 106 is thus readied for communications with the router 105. The sensor node 106 is then placed in or transported to a location where the sensor node 106 is actually run.

The deployment management subsystem 116 next loads a deployment function 15 in the tamper resistant device 121 through the controller 120 (240, 241). The deployment function 15 is a function loaded in the sensor node 106 by the deployment management system 110, and contains data/function used mainly in the issuing processing. The deployment function 15 is, in some cases, created for each sensor node and, in other cases, created for each sensor node group consisting of a number of sensor nodes. In still other cases, one same deployment function 15 is created for all manufactured sensor nodes.

The deployment management subsystem 116 registers the identifier of the sensor node 106 and the deployment key 5 in the data management database 115 through the data management subsystem 114 (242, 243).

FIG. 11 shows data held in the non-volatile memory 1213 of the tamper resistant device 121 upon completion of the processing of FIG. 9. The deployment management system 110 adds the deployment key 5, the deployment data 14, and the deployment function 15 to the non-volatile memory 1213 of the tamper resistant device 121.

FIG. 12 shows what data of the sensor node 106 is held in the data management database 115 upon completion of the processing of FIG. 9. The deployment management system 110 adds the deployment key 5 to the record entry for the sensor node 106 in the data management database 115.

Figure 13:
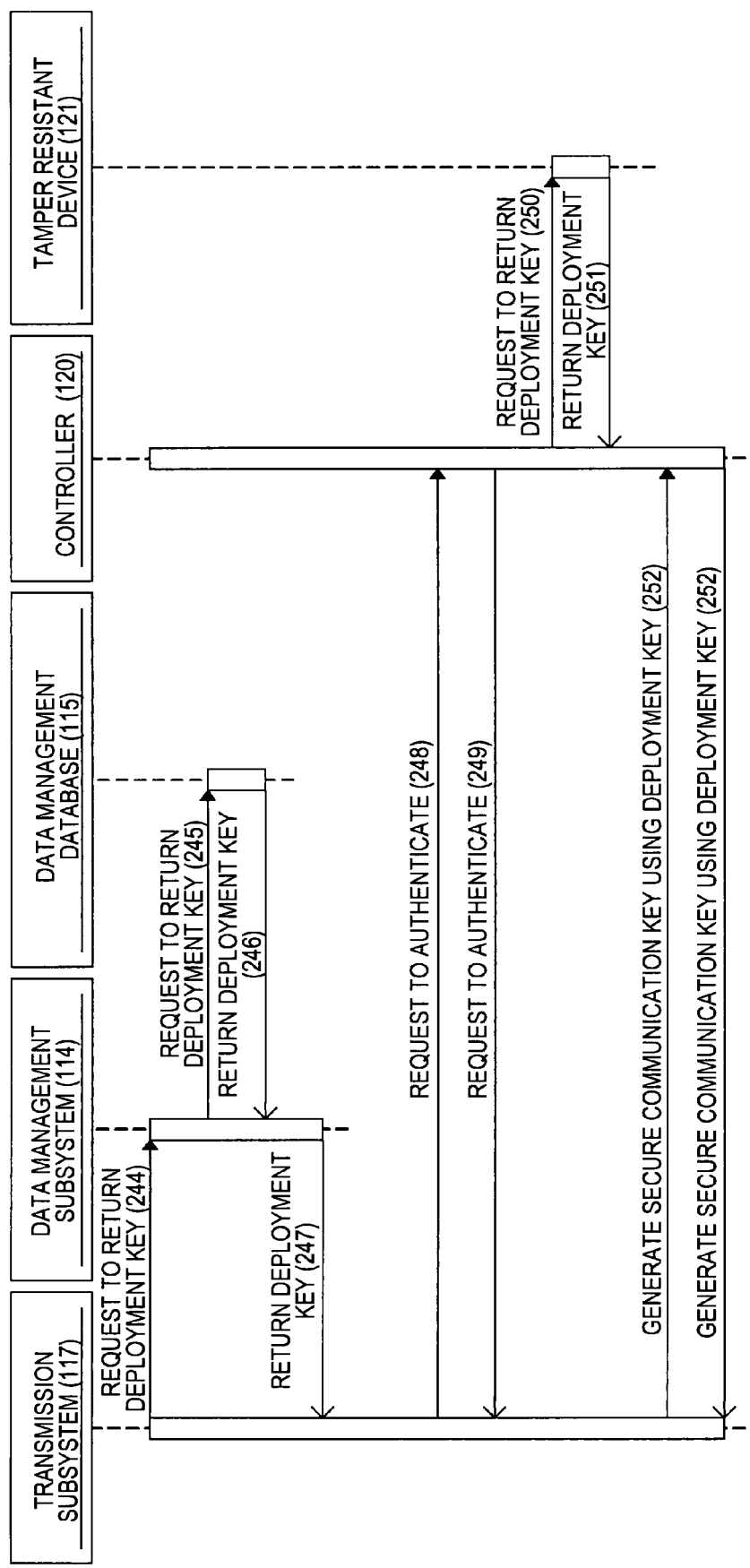
FIG. 13 is a time chart showing an example of processing that is executed in a router.

FIG. 13 is a time chart showing steps of processing in which the router 105 carries secure communications with the sensor node 106.

The transmission subsystem 117 of the router 105 receives the deployment key 5 from the data management database 115 through the data management subsystem 114 in order to communicate securely with the sensor node 106 received through transportation or the like (244, 245, 246, 247).

Next, the transmission subsystem 117 and the controller 120 of the sensor node 106 perform mutual authentication using the deployment key 5 which has been obtained from the data management system 109 and the activated deployment key 5 which has been stored in the non-volatile memory 1213 of the tamper resistant device 121 (248, 249). When the mutual authentication succeeds, the transmission subsystem 117 and the controller 120 exchange communication keys 6 used for communications (252, 253). The communication key 6 used for communications is created by the router for, in some cases, each sensor node and, in other cases, each sensor node group consisting of a number of sensor nodes. In still other cases, the router 105 creates one same communication key 6 for all manufactured sensor nodes. Therefore, the router 105 delivers the created communication key 6 to the successfully authenticated sensor node 106 and, from then on, the sensor node 106 and the router 105 communicate, with each other, data encrypted with the shared communication key 6.

The initial data 10, including a unique identifier set to the sensor node 106, is thus kept deactivated with keys during transportation from the time of manufacture of the sensor node 106 to the time the sensor node 106 is delivered to a user of the sensor net system 130 (the user of the sensor net system 130 in the above example is the deployment management system 110). Therefore, the initial data 10 deactivated with keys is not easily deciphered if the initial data 10 is extracted from the non-volatile memory 1213 of the tamper resistant device 121 during transportation by an intentional attack or the like. The initial data 10 is protected in this manner from when the sensor node 106 is manufactured until when the sensor node 106 is put into use.

To summarize, the sensor node manufacturing system 107, which manufactures the sensor node 106, the sensor net system 130, and systems placed between the system 107 and the system 130 are connected to the data management system 109 via the network 122, and keys issued by the respective systems are managed by the data management system 109.

A system from which the sensor node 106 is transported (a first computer system) creates a first key (the manufacturer key 1) and a second key (the initial key 2), deactivates the initial data 10 with the first key, and sends the first key and the second key to the data management system 109 (a third system). Before transporting the sensor node 106 to the next system, the source system (the first computer system) stores the deactivated initial data 10 and the second key in the non-volatile memory 1213 of the tamper resistant device 121 of the sensor node 106.

The next system (a second system) obtains, from the third system, the second key issued by the source system, and checks the obtained second key against the second key that is stored in the tamper resistant device 121 of the transported sensor node 106, thereby judging whether the transported sensor node 106 is authentic or not.

The second system (the operational function loading system 108) obtains, from the third system (the data management system 109), the first and second keys issued by the first system (the sensor node manufacturing system 107) from which the sensor node 106 is transported. Using the obtained keys, the second system activates the initial data 10 and other data stored in the non-volatile memory 1213 of the tamper resistant device 121.

As in the source system, a first key (the loader key 4) and a second key (the transportation key 3) are created in the second system (the operational function loading system 108). The second system adds new data to the tamper resistant device 121 of the sensor node 106, deactivates the new data and the initial data 10 with the first key, and sends the first key to the data management system 109. Before transporting the sensor node 106 to the next system, the source system (the second system) stores the deactivated initial data 10 and the second key in the non-volatile memory 1213 of the tamper resistant device 121 of the sensor node 106.

In this manner, a system from which the sensor node 106 is transported creates a first key and a second key, sends the two keys to the data management system 109, uses the first key to deactivate the initial data 10, stores the second key in the tamper resistant device 121 of the sensor node 106, and then transports the sensor node 106 to the next system.

The first key with which the initial data 10 is deactivated is circulated among the systems via the network 122 without being stored in the tamper resistant device 121. On the other hand, the second key, which is stored in the non-volatile memory 1213 of the tamper resistant device 121 to be used for authentication of the sensor node 106, cannot be used to activate the deactivated initial data 10. Accordingly, if data in the tamper resistant device 121 is obtained in an unauthorized manner by physically attacking the tamper resistant device 121 during transportation of the sensor node 106, the deactivated initial data 10 is not easily activated and the initial data 10 of the sensor node 106 is protected. Unauthorized use of the sensor net system 130 due to a leak of the initial data 10 is thus prevented, and the security of the sensor net system 130 is enhanced. A system to which the sensor node 106 is transported has to perform, using the second key, mutual authentication with a system from which the sensor node 106 is transported before it can obtain the first key from the data management system 109 and activate the deactivated initial data 10 in the tamper resistant device 121.

Furthermore, since the first key and the second key differ from one system to another between which the sensor node 106 is transported, the initial data 10 and other data can be protected even more securely during transportation. The security during transportation is ensured by storing a different second key in the sensor node 106 each time the sensor node 106 is sequentially transported among the systems: from the sensor node manufacturing system 107, which manufactures hardware of the sensor node 106, to the operational function loading system 108, and then from the operational function loading system 108 to the deployment management system 110.

The initial data 10 and other data, which, in the above example, are stored in the tamper resistant device 121, may be stored, after deactivated, in the non-volatile memory 1203 of the controller 120 when the sensor node 106 does not have the tamper resistant device 121. In this case, there is a possibility that the deactivated initial data 10 and the activated second key are extracted from the non-volatile memory 1203 through unauthorized access. However, it is not easy to decipher the deactivated initial data 10 since the deactivated initial data 10 cannot be activated with the second key. This invention therefore functions effectively for the sensor node 106 that does not have the tamper resistant device 121 as well.

Second Embodiment

A second embodiment of this invention will now be described.

In the first embodiment described above, the controller 120 sends the deactivated initial data 10 and the deactivated operational function data 12 from the tamper resistant device 121 to the loading management subsystem 113 and the deployment management subsystem 116 while the respective subsystems activate the deactivated initial data 10 and operational function data 12 (213 to 220, 231 to 239). The second embodiment, on the other hand, deals with an example in which the deactivated initial data 10 and operational function data 12 are activated inside the tamper resistant device 121.

Figure 14:
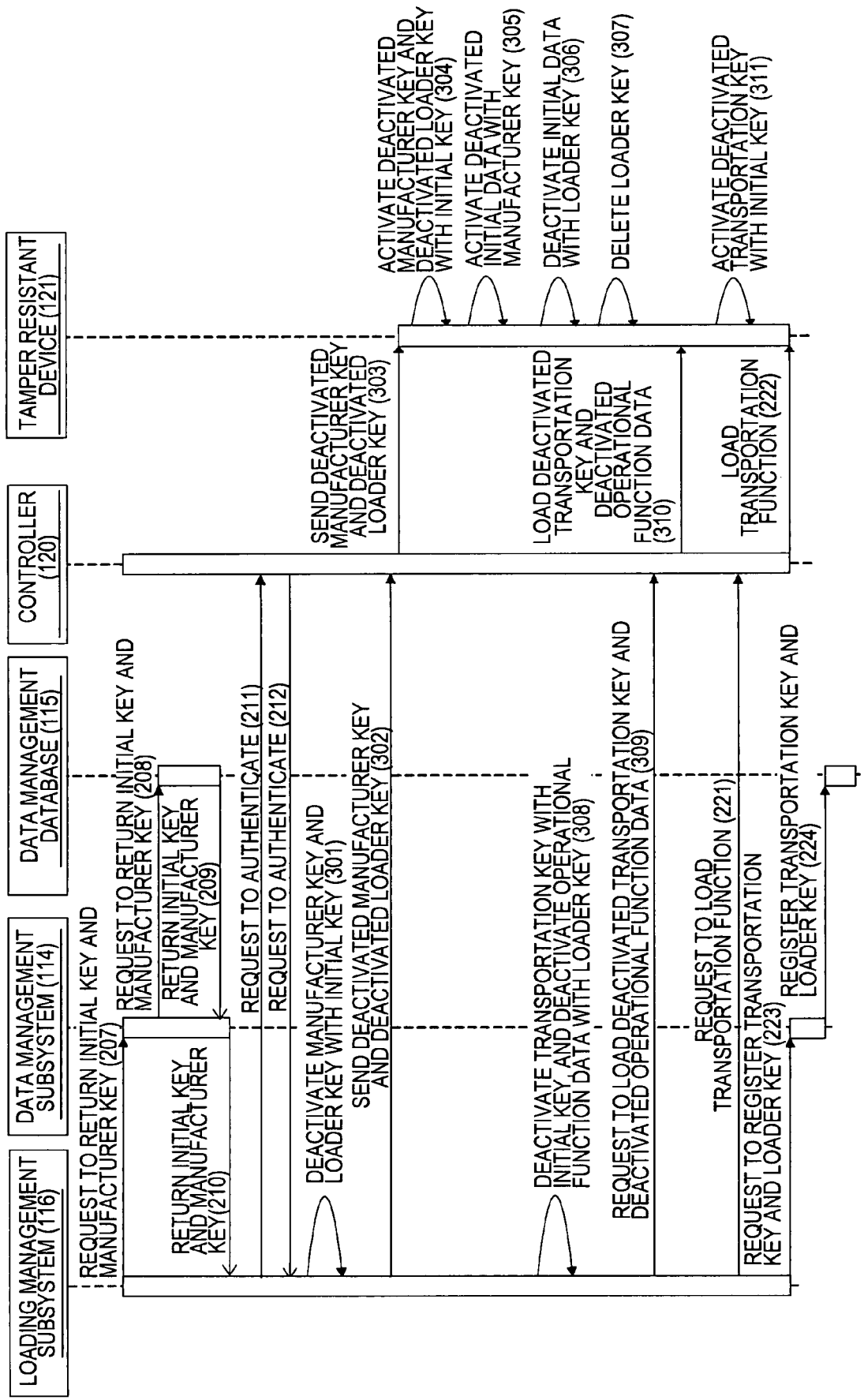
FIG. 14 is a time chart showing an example of processing that is executed in the operational function loading system according to a second embodiment.

FIG. 14 is a time chart illustrating steps of processing in which the operational function loading system 108 loads deactivated data in the sensor node 106 and the deactivated data is activated in the tamper resistant device 121 of the sensor node 106.

In the processing of FIG. 14 (207 to 212), mutual authentication is executed between the loading management subsystem 113 of the operational function loading system 108 and the controller 120 as in the processing described in the first embodiment with reference to FIG. 7. When the mutual authentication succeeds, the loading management subsystem 113 deactivates the manufacturer key 1 and the loader key 4 with the initial key 2 (301), and sends the deactivated keys to the tamper resistant device 121 through the controller 120 (302, 303).

The tamper resistant device 121 uses the activated initial key 2 stored in the non-volatile memory 1213 of the tamper resistant device 121 to activate the deactivated manufacturer key 1 and the deactivated loader key 4 (304), and uses the activated manufacturer key 1 to activate the deactivated initial key 10 (305). This enables the operational function loading system 108 to refer to the initial data 10 deactivated by the sensor node manufacturing system 107.

The loading management subsystem 113 next deactivates the initial data 10 with the loader key 4 (306), and deletes the loader key 4 used for the deactivation (307). In this way, the initial data 10 deactivated in the sensor node manufacturing system 107 with the manufacturer key 1 is again deactivated with the loader key 4 that is created by the operational function loading system 108, which is currently processing the sensor node 106 by adding functions to the sensor node 106. Since a different key is used to deactivate the initial data 10 for the second time, the current initial data 10 cannot be activated with data that is held in the sensor node manufacturing system 107.

The loading management subsystem 113 deactivates the transportation key 3 with the initial key 2 and deactivates the operational function data 12 with the loader key 4 (308). The loading management subsystem 113 sends, through the controller 120, to the tamper resistant device 121, a request to load the deactivated transportation key 3 and the deactivated operational function data 12 (309, 310). The tamper resistant device 121 stores in the non-volatile memory 1213 the deactivated transportation key 3 and the deactivated operational function data 12 that have been received through the controller 120.

The tamper resistant device 121 activates the deactivated transportation key 3 with the initial key 2, and stores the activated transportation key 3 in the non-volatile memory 1213 (311). Steps 221 to 224 of FIG. 14 are the same as those described in the first embodiment with reference to FIG. 7.

FIG. 15 shows data held in the tamper resistant device 121 upon completion of the processing of FIG. 14. The operational function loading system 108 adds the transportation key 3, the transportation function 13, and the deactivated operational function data 12 to the non-volatile memory 1213 of the tamper resistant device 121, and updates the deactivated initial data 10 by switching the encryption key to the loader key 4. Data of the sensor node 106 that is held in the data management database 115 upon completion of the processing of FIG. 14 is the same as the one shown in FIG. 9.

Figure 16:
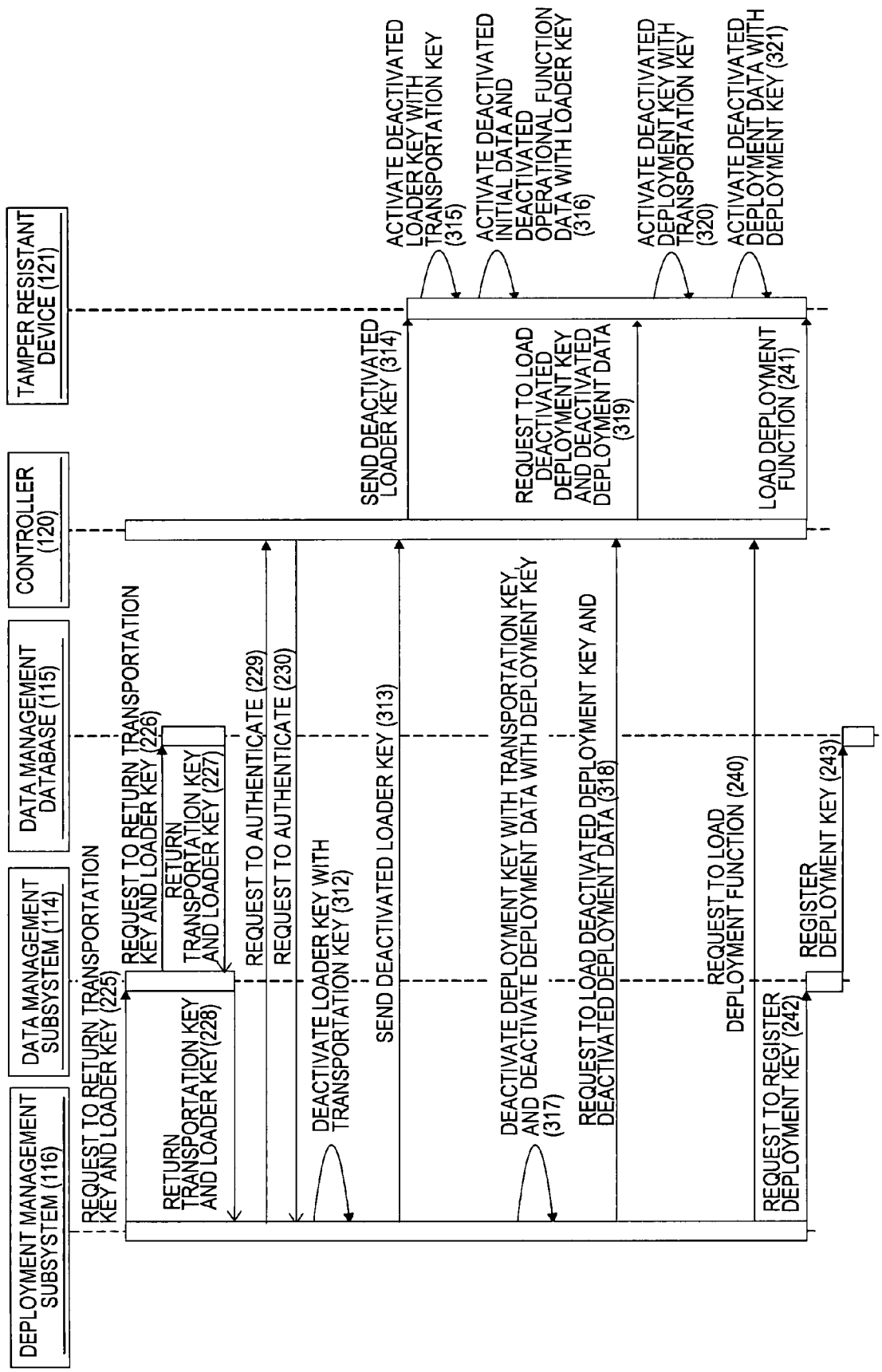
FIG. 16 is a time chart showing an example of processing that is executed in the deployment management system according to the second embodiment.

FIG. 16 is a time chart illustrating steps of processing in which the deployment management system 110 loads deactivated data in the sensor node 106 and the deactivated data is activated in the tamper resistant device 121 of the sensor node 106.

In Steps 225 to 230 of FIG. 16, mutual authentication is executed between the deployment management subsystem 116 and the controller 120 as in the processing described in the first embodiment with reference to FIG. 10. When the mutual authentication succeeds, the deployment management subsystem 116 deactivates the loader key 4 with the transportation key 3 (312), and sends the deactivated key to the tamper resistant device 121 through the controller 120 (313, 314).

The tamper resistant device 121 activates the deactivated loader key 4 with the transportation key 3 (315), and uses the activated loader key 4 to activate the deactivated initial data 10 and the deactivated operational function data 12 (316). As a result, the initial data 10 and the operational function data 12 in the tamper resistant device 121 can be referred to by the deployment management system 110, and can be used in the subsequent sensor net system 130.

The deployment management subsystem 116 next deactivates the deployment data 14 with the deployment key 5, and deactivates the deployment key 5 with the transportation key 3 (317). The deployment management subsystem 116 sends, through the controller 120, to the tamper resistant device 121, a request to load the deactivated deployment key 5 and the deactivated deployment data 14 (318, 319).

The controller 120 uses the transportation key 3 to activate the deactivated deployment key 5 in the tamper resistant device 121, and loads the activated key in the non-volatile memory 1213 (320). The controller 120 uses the deployment key 5 to activate the deactivated deployment data 14 in the tamper resistant device 121, and loads the activated data in the non-volatile memory 1213 (321). Steps 240 to 243 shown in FIG. 16 are the same as those in FIG. 10.

FIG. 17 shows data held in the tamper resistant device 121 upon completion of the processing of FIG. 16. The deployment management system 110 adds the deployment key 5, the deployment data 14, and the deployment function 15 to the non-volatile memory 1213 of the tamper resistant device 121, and activates the initial data 10 and the keys to ready the initial data 10 and the keys for use.

As described above, leakage of keys from the systems that the sensor node 106 passes to external systems is prevented by having the CPU 1211 of the tamper resistant device 121 activate and deactivate data.

Third Embodiment

A third embodiment of this invention will now be described.

In the first embodiment described above, the transmission subsystem 117 of the router 105 in FIGS. 1 and 13 receives the deployment key 5 from the data management database 115 through the data management subsystem 114 of the data management system 109 (244 to 247). The third embodiment, on the other hand, deals with an example in which the transmission subsystem 117 of the router 105 receives the deployment key 5 from the deployment management subsystem 116 of the deployment management system 110. The deployment management system 110 accordingly skips the processing of registering the deployment key 5 in the data management database 115 of the data management system 109 (242, 243) that has been described in the first embodiment with reference to FIG. 10, and the deployment management system 110 itself holds the deployment key 5 of the sensor node 106.

Figure 18:
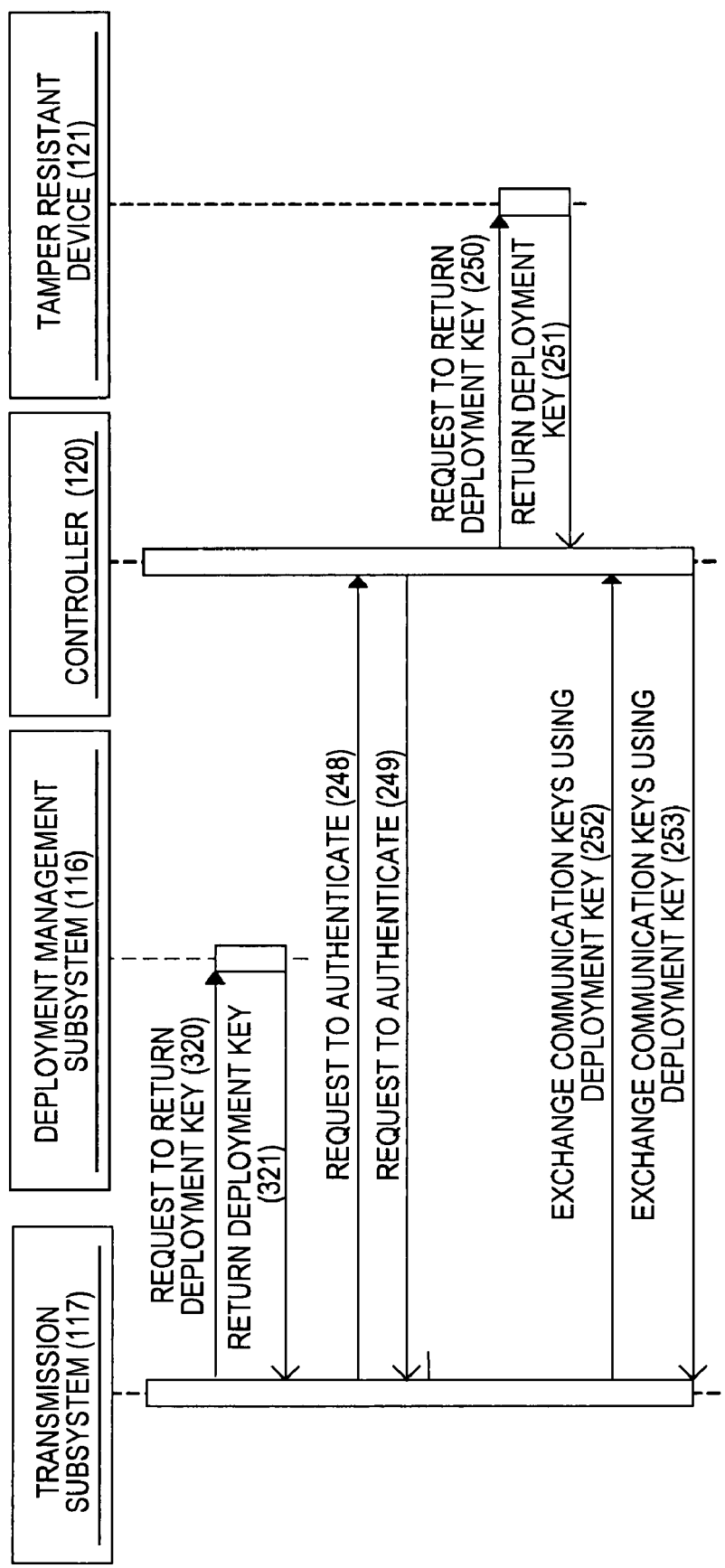
FIG. 18 is a time chart showing an example of processing that is executed in the router according to a third embodiment.

FIG. 18 is a time chart showing steps of processing in which the router 105 receives the deployment key 5 from the deployment management system 110 in order to communicate securely with the sensor node 106.

The transmission subsystem 117 in the data transmission system 111 of the router 105 receives the deployment key 5 associated with the sensor node 106 from the deployment management subsystem 116 of the deployment management system 110 (320, 321). In Steps 248 to 253 of FIG. 18 which are the same as those described in the first embodiment with reference to FIG. 13, the transmission subsystem 117 of the router 105 and the tamper resistant device 121 execute mutual authentication using their respective deployment keys 5. When the authentication succeeds, the transmission subsystem 117 and the tamper resistant device 121 exchange the communication keys 6.

Through the above processing, the deployment management system 110 and the sensor net system 130 perform authentication on the router 105 and the sensor node 106, so only the successfully authenticated sensor node 106 is allowed to join the sensor net system 130 irrespective of whether the data management system 109 is present on the network 122 when the sensor net system 130 is put into operation.

In FIGS. 5, 8, and 11 illustrating the first embodiment and FIGS. 15 and 17 illustrating the second embodiment, the transportation key 3 and other data related to the issuing processing are loaded in the tamper resistant device 121. The data may be deleted from the tamper resistant device 121 at an appropriate time if necessary.

The data management database 115, which, in FIGS. 6, 9, and 12 illustrating the first embodiment, holds only data of one sensor node 106, is used to manage data of multiple sensor nodes 106 in practice.

According to the above first to third embodiments, the deployment management system 110 performs processing of sharing confidential data between the sensor node 106 and the router 105 and mutual authentication is executed between the sensor node 106 and the router 105, to thereby allow only limited routers 105 to communicate with the sensor node 106 and make communications between the sensor node 106 and the router 105 secure. In addition, data to be loaded in the tamper resistant device 121 of the sensor node 106 is deactivated by the sensor node manufacturing system 107, and other systems before loaded, and the data management system 109 manages activation data of the respective systems, thus controlling access to the data loaded in the sensor node 106 and accomplishing secure operation of the sensor node 106. Only when the deployment key 5 held in the sensor node 106 matches the deployment key 5 obtained by the router 105 from the data management system 109 or from the deployment management system 110, the router 5 and the sensor node 106 are successfully authenticated, and the router 105 is allowed to collect sensing data of the sensor node 106. An invalid sensor node 106 which contains tampered data is thus prevented from joining the sensor net system 130.

The best mode of carrying out this invention has been described. However, the sensor node issuing management method and system according to this invention are not limited to the examples described above with reference to the drawings, and various modifications can be made without departing from the spirit of this invention.

The processing in the respective subsystems can be executed by reading programs onto computers.

As described above, this invention is applicable to a system that manufactures a sensor node, a system that manufactures software loaded in a sensor node, a system that runs a sensor node, a sensor net system, and a sensor node.

While the present invention has been described in detail and pictorially in the accompanying drawings, the present invention is not limited to such detail but covers various obvious modifications and equivalent arrangements, which fall within the purview of the appended claims.

What is claimed is:

1. A sensor node data protection method for setting unique data to a sensor node and protecting the unique data, the sensor node having a radio communication module for performing communications with one of a base station, a first computer system, and a second computer system, and a storage unit for holding data, the sensor node data protection method comprising the steps of:
    creating, by the first computer system, a first key and a second key;
    deactivating, by the first computer system, the unique data with the first key, and storing the deactivated unique data in the storage unit of the sensor node;
    storing, by the first computer system, the second key in the storage unit of the sensor node;
    storing, by the first computer system, the first key and the second key in a computer system set in advance;
    obtaining, by the second computer system, the first key and the second key from the computer system set in advance after the sensor node arrives at the second computer system from the first computer system; and
    executing authentication using the second key that is obtained by the second computer system and the second key that is in the storage unit of the sensor node.

2. The sensor node data protection method according to claim 1,
    wherein the computer system set in advance comprises a third computer system connected to the first computer system and the second computer system,
    wherein the step of storing the first key and the second key in the computer system set in advance includes storing, by the first computer system, the first key and the second key in the third computer system, and
    wherein the step of obtaining the first key and the second key from the computer system set in advance includes obtaining, by the second computer system, the first key and the second key from the third computer system after the sensor node arrives at the second computer system from the first computer system.

3. The sensor node data protection method according to claim 1,
    wherein the computer system set in advance comprises the first computer system,
    wherein the step of storing the first key and the second key in the computer system set in advance includes storing, by the first computer system, the first key and the second key in the first computer system, and
    wherein the step of obtaining the first key and the second key from the computer system set in advance includes obtaining, by the second computer system, the first key and the second key from the first computer system after the sensor node arrives at the second computer system from the first computer system.

4. The sensor node data protection method according to claim 2,
    wherein the first computer system comprises a computer system for manufacturing the sensor node,
    wherein the second computer system comprises a computer system for setting functions in the sensor node, and
    wherein the third computer system stores the first key and the second key that are created by the first computer system.

5. The sensor node data protection method according to claim 3,
    wherein the first computer system comprises a computer system for setting functions in the sensor node, and
    wherein the second computer system comprises a base station of a sensor net system for performing communications with the sensor node.

6. The sensor node data protection method according to claim 1, further comprising the step of reading, by the second computer system, the deactivated unique data out of the storage unit of the sensor node, and activating the deactivated unique data with the obtained first key, when the authentication succeeds.

7. The sensor node data protection method according to claim 1, further comprising the steps of:
    obtaining, by the sensor node, the first key from the second computer system; and
    activating, by the sensor node, the deactivated unique data with the obtained first key, when the authentication succeeds.

8. The sensor node data protection method according to claim 5, further comprising the step of sending, by the base station, a key that is used for communications to the sensor node, when the authentication succeeds.

9. A computer system for transporting a sensor node, comprising:
    a sensor node having a sensor for measuring given data, a radio communication module for performing communications, and a storage unit for holding data;
    a first computer system for setting data in the sensor node;
    a second computer system for setting, in the sensor node, one of a function and data for running the sensor node; and
    a network connecting the first computer system and the second computer system,
    wherein the first computer system includes:
        a key creating unit for creating a first key and a second key, the first key being used to deactivate data that is unique to the sensor node and that is stored in the storage unit of the sensor node, the second key being used for authentication between the sensor node and one of the first computer system and the second computer system;
        an encryption unit for deactivating the unique data with the first key and storing the deactivated unique data in the storage unit of the sensor node;
        a key storing unit for storing the second key in the storage unit of the sensor node; and
        a key sending unit for sending the created first key and second key to a computer system set in advance, and
    wherein the second computer system includes:

a key obtaining unit for obtaining the first key and the second key from the computer system set in advance after the sensor node arrives at the second computer system from the first computer system; and an authentication unit for performing authentication using the obtained second key and the second key that is in the storage unit of the sensor node.

10. The computer system for transporting a sensor node according to claim 9, wherein the computer system set in advance comprises a third computer system connected to the first computer system and the second computer system, wherein the key sending unit of the first computer system stores the first key and the second key in the third computer system, and wherein the key obtaining unit of the second computer system obtains the first key and the second key from the third computer system after the sensor node arrives at the second computer system from the first computer system.

11. The computer system for transporting a sensor node according to claim 9, wherein the computer system set in advance comprises the first computer system, wherein the key sending unit of the first computer system stores the first key and the second key in the first computer system, and wherein the key obtaining unit of the second computer system obtains the first key and the second key from the first computer system after the sensor node arrives at the second computer system from the first computer system.

12. The computer system for transporting a sensor node according to claim 10, wherein the first computer system comprises a computer system for manufacturing the sensor node, wherein the second computer system comprises a computer system for setting functions in the sensor node, and wherein the third computer system stores the first key and the second key that are created by the first computer system.

13. The computer system for transporting a sensor node according to claim 11, wherein the first computer system comprises a computer system for setting functions in the sensor node, and wherein the second computer system comprises a base station of a sensor net system for performing communications with the sensor node.

14. The computer system for transporting a sensor node according to claim 9, wherein the second computer system has a data activating unit for reading the unique data deactivated by the second computer system out of the storage unit of the sensor node and activating the deactivated unique data with the obtained first key, when the authentication succeeds in the authentication unit.

15. The computer system for transporting a sensor node according to claim 9, wherein the sensor node has an activation unit for obtaining, by the sensor node, the first key from the second computer system and activating the deactivated unique data with the obtained first key, when the authentication succeeds.

16. The computer system for transporting a sensor node according to claim 13, wherein the base station has a communication key sending unit for sending a key used for communications to the sensor node, when the authentication succeeds.

17. A sensor node, comprising:

a sensor for measuring given data;

a radio communication module for performing communications;

a storage unit for holding data; and a controller for controlling the sensor, the radio communication module, and the storage unit, wherein the controller has an authentication unit for storing, in the storage unit, data that is unique to the sensor node and that is deactivated with a first key in advance, and responding to an authentication request received through the radio communication module by using the second key which is stored in the storage unit in advance.

18. The sensor node according to claim 17, wherein the controller has an encryption unit for using a communication key received by the radio communication module to encrypt data that is communicated from then on, when the authentication succeeds in the authentication unit.

19. The sensor node according to claim 17, wherein the controller has an activation unit for using the first key received by the radio communication module to activate the deactivated unique data in the storage unit, when the authentication succeeds in the authentication unit.

20. The sensor node according to claim 17, wherein the storage unit is comprised of a tamper resistant device.

* * * * *